(12) United States Patent
Aizaki et al.

(10) Patent No.: US 9,964,838 B2
(45) Date of Patent: May 8, 2018

(54) PROJECTION DISPLAY DEVICE

(71) Applicant: JVC KENWOOD Corporation, Yokohama-shi, Kanagawa (JP)

(72) Inventors: Takatsugu Aizaki, Yokohama (JP); Shinji Kikuma, Yokohama (JP); Yasuki Arihara, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days. days.

(21) Appl. No.: 15/689,162

(22) Filed: Aug. 29, 2017

(65) Prior Publication Data

US 2018/0059518 A1 Mar. 1, 2018

(30) Foreign Application Priority Data

Sep. 1, 2016 (JP) .................. 2016-170824

(51) Int. Cl.
*G03B 21/00* (2006.01)
*G02B 27/14* (2006.01)
*G02B 5/30* (2006.01)
*G02F 1/1335* (2006.01)

(52) U.S. Cl.
CPC ......... *G03B 21/006* (2013.01); *G02B 5/3025* (2013.01); *G02B 27/141* (2013.01); *G02F 1/133621* (2013.01)

(58) Field of Classification Search
CPC ...... G03B 26/0833; G02F 1/13; H04N 9/3102
See application file for complete search history.

(56) References Cited

U.S. PATENT DOCUMENTS

| | | | |
|---|---|---|---|
| 2006/0055888 A1* | 3/2006 | Inoko | H04N 9/3105 353/20 |
| 2006/0187416 A1* | 8/2006 | Ouchi | G02B 27/1026 353/31 |
| 2007/0030424 A1* | 2/2007 | Shimizu | G02F 1/133553 349/113 |

FOREIGN PATENT DOCUMENTS

JP 2008158274 7/2008

* cited by examiner

*Primary Examiner* — Joseph L Williams
*Assistant Examiner* — Jose M Diaz
(74) *Attorney, Agent, or Firm* — Amin, Turocy & Watson LLP (57) ABSTRACT

Provided are: a light source device; first, second, and third color separation elements; first, second, and third reflective members which reflect first, second, and third color light in a third direction; first, second, and third reflective liquid crystal panels which optically modulate the first, second, and third color light; a combining optical system which combines the optically modulated first, second and third color light to generate combined light; a projection optical system which projects the combined light; and a relay optical system which is arranged in an optical path of the first color light between the first color separation element and the first reflective liquid crystal panel and forms an erect image.

5 Claims, 6 Drawing Sheets

PROJECTION DISPLAY DEVICE

CROSS-REFERENCE TO RELATED APPLICATION(S)

The present application claims priority to and incorporates by reference the entire contents of Japanese Patent Application No. 2016-170824 filed in Japan on Sep. 1, 2016.

BACKGROUND OF THE INVENTION

1. Field of the Invention

The present invention relates to a projection display device.

2. Description of the Related Art

A projection display device includes: an illumination optical system that illuminates a plurality of light modulation elements with different color light; a combining optical system that combines a plurality of color light optically modulated by the light modulation elements to generate combined light; and a projection optical system that projects the combined light generated by the combining optical system. The illumination optical system includes a plurality of optical components such as a mirror, a lens, and a color separation element. Light emitted from a light source is separated into a plurality of color light after passing through the plurality of optical components of the illumination optical system, and is emitted to the light modulation element. Japanese Laid-open Patent Publication No. 2008-158274 is disclosed.

Incidentally, the optical component of the illumination optical system causes an object on a light incident side of the optical component to be imaged on a light emission side of the optical component. For example, if the optical component is a mirror, the optical component forms a mirror image of the object. In addition, if the optical component is a convex lens, the optical component forms an inverted image of the object. Therefore, in the case of an illumination optical system in which a type or the number of optical components arranged in each optical path of a plurality of color light is different, there is a possibility that a direction of the image formation on the light emission side of the projection optical system may be different for each color light.

There is a possibility that a deviation may be generated in illuminance distribution of the color light with which the light modulating element is irradiated due to a mounting error of the light source or a positional change of the light source or the like. When the deviation is generated in the illuminance distribution of the color light with which the light modulation element is irradiated in the case where the direction of image formation is different for each color light, there is a possibility that color unevenness may occur in an image projected by the projection optical system.

SUMMARY OF THE INVENTION

It is an object of the present invention to at least partially solve the problems in the conventional technology.

In an aspect of the present embodiment, a projection display device is provided which comprises: a first color separation element which separates first color light from light emitted from a light source device and emits the first color light in a first direction parallel to a first axis in a predetermined plane; a second color separation element which separates the light emitted from the first color separation element into second color light and third color light, emits the second color light in the first direction, and emits the third color light in a second direction parallel to a second axis which is orthogonal to the first axis in the predetermined plane; a first reflective member which reflects the first color light emitted from the first color separation element in a third direction parallel to a third axis orthogonal to the predetermined plane; a second reflective member which reflects the second color light emitted from the second color separation element in the third direction; a third reflective member which reflects the third color light emitted from the second color separation element in the third direction; a first reflective liquid crystal panel which has a first incident surface to which the first color light reflected by the first reflective member is incident and optically modulates the first color light based on image data; a second reflective liquid crystal panel which has a second incident surface to which the second color light reflected by the second reflective member is incident and optically modulates the second color light based on the image data; a third reflective liquid crystal panel which has a third incident surface to which the third color light reflected by the third reflective member is incident and optically modulates the third color light based on the image data; a combining optical system which combines the first color light optically modulated by the first reflective liquid crystal panel, the second color light optically modulated by the second reflective liquid crystal panel, and the third color light optically modulated by the third reflective liquid crystal panel to generate combined light; a projection optical system which projects the combined light generated by the combining optical system; and a relay optical system which is arranged in an optical path of the first color light between the first color separation element and the first reflective liquid crystal panel, and forms an erect image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will be described with reference to the drawings, but the present invention is not limited thereto. Constituent elements of the embodiment to be described below can be appropriately combined. In addition, some constituent elements may not be used in some cases.

In the following description, an XYZ orthogonal coordinate system is set, and the positional relationship of each part will be described with reference to the XYZ orthogonal coordinate system. A direction parallel to an X-axis, which is a first axis in a predetermined plane, will be set as an X-axis direction, a direction parallel to a Y-axis, which is a second axis orthogonal to the first axis in the predetermined plane, will be set as a Y-axis direction, and a direction parallel to a Z-axis, which is a third axis orthogonal to the first axis and the second axis, will be set as a Z-axis direction. The third axis is orthogonal to the predetermined plane. In addition, one direction of the X-axis direction will be set as a +X direction, and a reverse direction of the +X direction will be set as a −X direction. One direction of the Y-axis direction will be set as a +Y direction, and a reverse direction of the +Y direction will be set as a −Y direction. One direction of the Z-axis direction will be set as a +Z direction, and a reverse direction of the +Z direction will be set as a −Z direction. In the present embodiment, the predetermined plane is parallel to a horizontal plane, and the Z-axis direction is a vertical direction. In the following description, the predetermined plane will be appropriately referred to as an XY plane.

Figure 1:
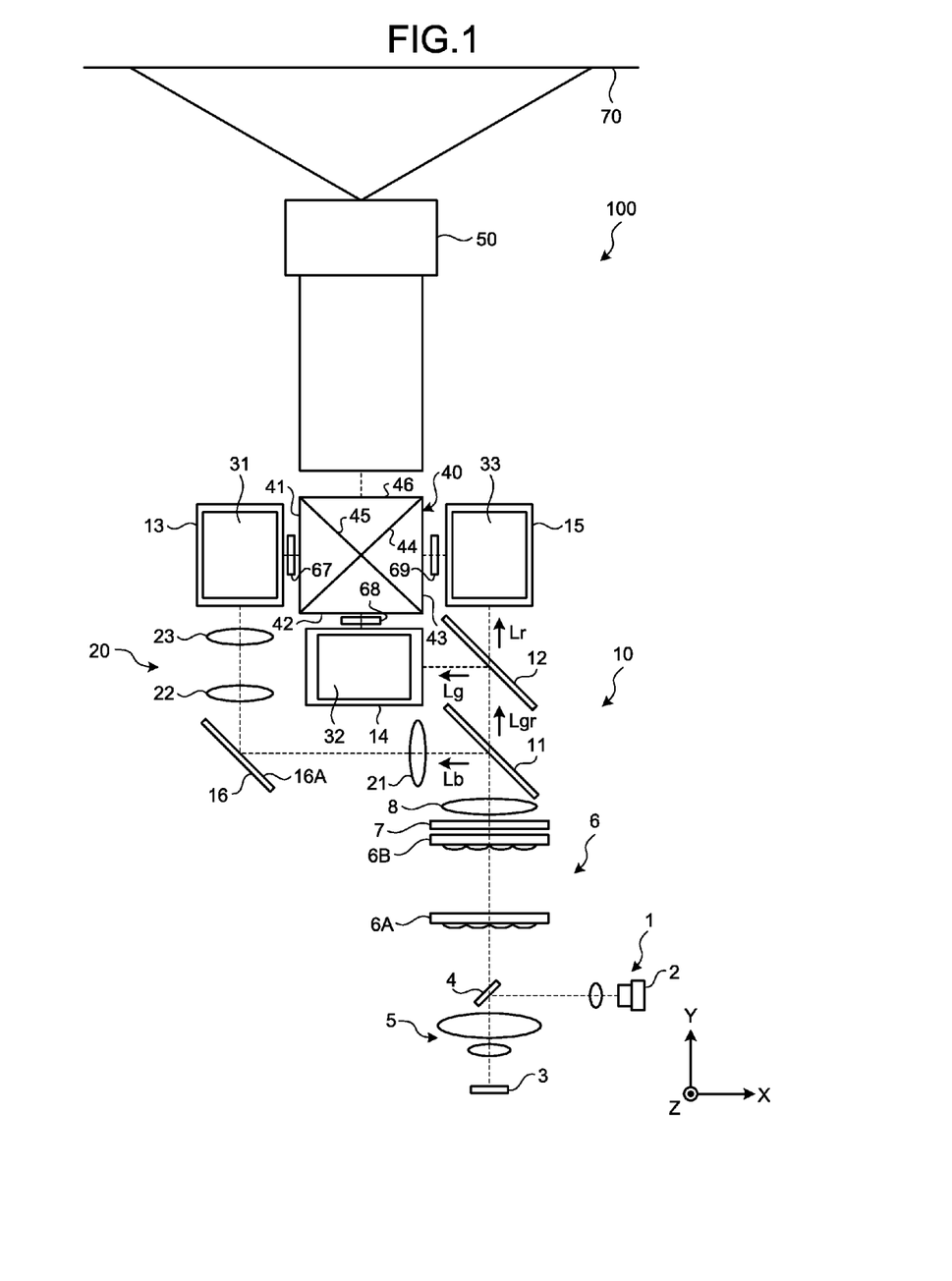
FIG. 1 is a plan view schematically illustrating an example of a projection display device according to this embodiment.
Figure 2:
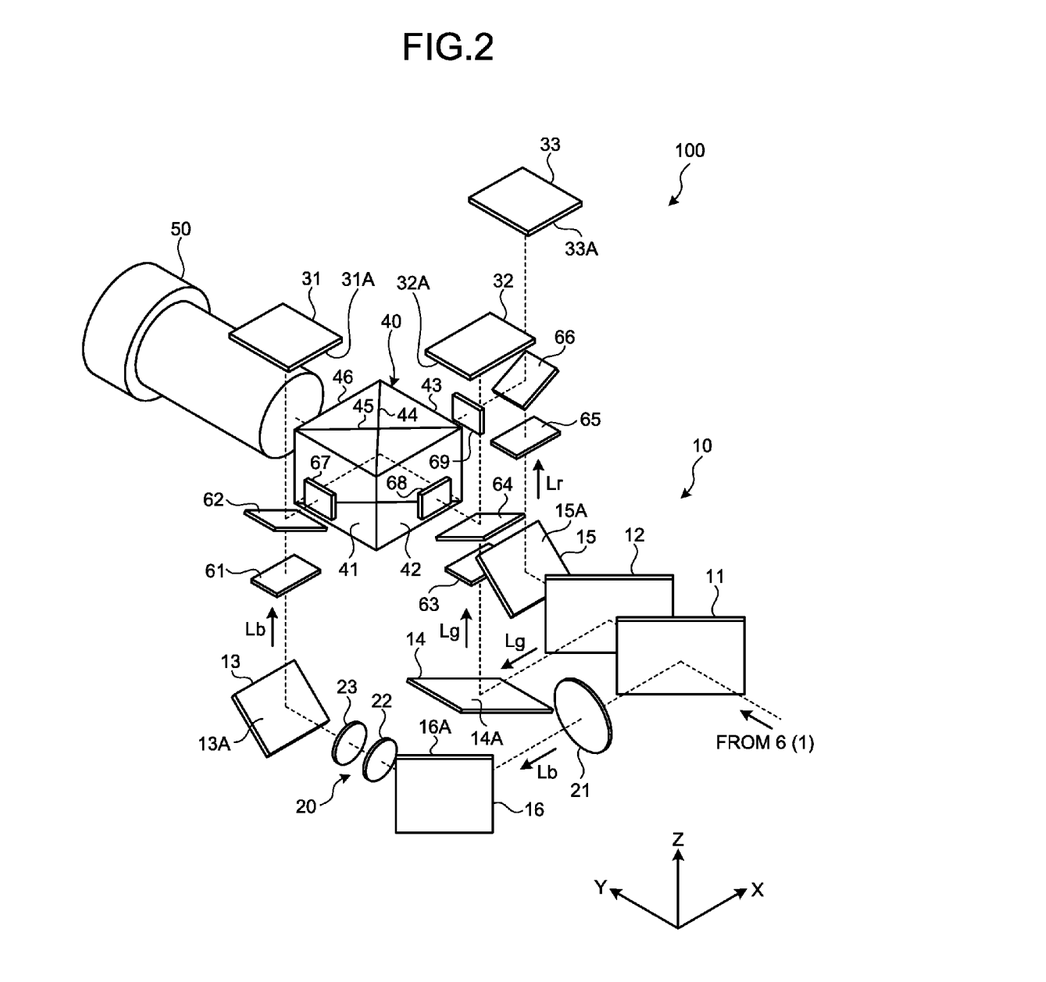
FIG. 2 is a perspective view schematically illustrating an example of the projection display device according to the present embodiment.

FIG. 1 is a plan view schematically illustrating an example of a projection display device 100 according to this embodiment. FIG. 2 is a perspective view schematically illustrating an example of the projection display device 100 according to the present embodiment. As illustrated in FIGS. 1 and 2, the projection display device 100 includes: a light source device 1 which generates light; an illumination optical system 10 which includes a first color separation element 11 and a second color separation element 12 and generates first color light Lb, second color light Lg, and third color light Lr by performing color separation of light emitted from the light source device 1; a first reflective liquid crystal panel 31, a second reflective liquid crystal panel 32, and a third reflective liquid crystal panel 33 which are arranged in optical paths of the first color light Lb, the second color light Lg, and the third color light Lr, respectively, generated by the illumination optical system 10 and optically modulate the first color light Lb, the second color light Lg, and the third color light Lr, respectively, based on image data; a combining optical system 40 which combines the first color light Lb, the second color light Lg, and the third color light Lr, which have been optically modulated by the first reflective liquid crystal panel 31, the second reflective liquid crystal panel 32, and the third reflective liquid crystal panel 33, to generate combined light; and a projection optical system 50 which projects the combined light generated by the combining optical system 40.

The light source device 1 generates white light. In the present embodiment, the light source device 1 includes a solid light source 2 which emits excitation light, a phosphor 3 which generates fluorescent light by being irradiated with the excitation light, a half mirror 4 which guides the excitation light emitted from the solid light source 2 to the phosphor 3, and a light-collection optical system 5 which condenses the excitation light with which the phosphor 3 is irradiated. The solid light source 2 includes a laser diode (LD). The solid light source 2 emits blue laser light as the excitation light. The phosphor 3 is irradiated with the excitation light emitted from the solid light source 2 via the half mirror 4 and the light-collection optical system 5. When being irradiated with the excitation light, the phosphor 3 generates yellow fluorescent light. The white light is generated based on the excitation light and the fluorescent light. The white light generated by the light source device 1 is incident to the illumination optical system 10.

The illumination optical system 10 performs color separation of the light emitted from the light source device 1 to generate the plurality of color light Lb, Lg and Lr. The illumination optical system 10 includes: an integrator optical system 6 to which the light emitted from the light source device 1 is incident; a first color separation element 11 which separates the first color light Lb from the light emitted from the integrator optical system 6 and emits the light Lgr in the −X direction; a second color separation element 12 which separates the light Lgr emitted from the first color separation element 11 into the second color light Lg and the third color light Lr and emits the second color light Lg in the −X direction and the third color light Lr in the +Y direction; a first reflective member 13 which reflects the first color light Lb emitted from the first color separation element 11 in the +Z direction; a second reflective member 14 which reflects the second color light Lg emitted from the second color separation element 12 in the +Z direction; a third reflective member 15 which reflects the third color light Lr emitted from the second color separation element 12 in the +Z direction; and a relay optical system 20 which is arranged in the optical path of the first color light Lb and forms an erect image.

The integrator optical system 6 uniformizes illuminance of light emitted from the light source device 1. The integrator optical system 6 includes a first lens array 6A, a second lens array 6B, a polarization conversion element 7, and a condenser lens 8. An optical axis of the integrator optical system 6 is parallel to the Y-axis. The light emitted from the integrator optical system 6 advances in the +Y direction.

The first lens array 6A includes a plurality of micro lenses arranged in a matrix form inside an XZ plane. The second lens array 6B includes a plurality of micro lenses arranged in a matrix form inside the XZ plane. The plurality of micro lenses of the first lens array 6A and the plurality of micro lenses of the second lens array 6B have one-to-one correspondence. The polarization conversion element 7 includes a plurality of polarization conversion units. The polarization conversion unit includes a polarization separation film, a reflective mirror, and a phase plate. The plurality of micro lenses of the second lens array 6B and the plurality of polarization conversion units of the polarization conversion element 7 have one-to-one correspondence.

The light which has been emitted from the light source device 1 and incident to the integrator optical system 6 incident to each of the plurality of micro lenses of the first lens array 6A. A portion of the light incident to an incident surface of the integrator optical system 6 is incident to each of the plurality of micro lenses of the first lens array 6A according to each position of the micro lenses. Thus, light received by the micro lens differ from each other. The respective micro lenses of the first lens array 6A condense the light emitted from the light source device 1 onto the respective micro lenses of the second lens array 6B corresponding to the respective micro lenses of the first lens array 6A. A secondary light source image is formed in each of the plurality of micro lenses of the second lens array 6B. The second lens array 6B forms an optical pupil of the first lens array 6A.

Light from the secondary light source image formed in the respective micro lenses of the second lens array 6B is incident to the respective polarization conversion units of the polarization conversion element 7 corresponding to the micro lenses of the second lens array 6B. The light incident to the polarization conversion unit is separated into light in a first polarization state and light in a second polarization state by the polarization separation film. The light in the second polarization state separated by the polarization separation film is reflected by the reflective mirror, and then, is converted into light in the first polarization state by passing through the phase plate. That is, the light emitted from the light source device 1 is converted into light in the first polarization state by passing through the polarization conversion element 7.

The light emitted from each of the plurality of polarization conversion units is incident to the condenser lens 8. The condenser lens 8 causes the light emitted from each of the plurality of polarization conversion units to be superimposed on each other to form a single light flux. Accordingly, the illuminance distribution in each of the first reflective liquid crystal panel 31, the second reflective liquid crystal panel 32, and the third reflective liquid crystal panel 33 is equalized.

The first color separation element 11 is arranged on the +Y side of the integrator optical system 6. The first color separation element 11 includes a dichroic mirror. The first color separation element 11 separates the first color light Lb from the light which has been emitted from the light source device 1 and passed through the integrator optical system 6. In the present embodiment, the first color separation element 11 separates the white light emitted from the light source device 1 into blue light as the first color light Lb and the light Lgr having a different wavelength from the blue light. The first color light Lb as the blue light is reflected by the first color separation element 11 and proceeds in the −X direction. The light Lgr having the different wavelength from the blue light passes through the first color separation element 11 and proceeds in the +Y direction.

The second color separation element 12 is arranged on the +Y side of the first color separation element 11. The second color separation element 12 includes a dichroic mirror. The second color separation element 12 separates the light Lgr having the different wavelength from the blue light emitted from the first color separation element 11 into the second color light Lg and the third color light Lr. In the present embodiment, the second color separation element 12 separates the light Lgr emitted from the first color separation element 11 into green light as the second color light Lg and red light as the third color light Lr. The second color light Lg as the green light is reflected by the second color separation element 12 and proceeds in the −X direction. The third color light Lr as the red light passes through the second color separation element 12 and proceeds in the +Y direction.

The first reflective member 13 reflects the first color light Lb emitted from the first color separation element 11 in the +Z direction. In the present embodiment, the illumination optical system 10 includes a fourth reflective member 16 which is arranged between the first color separation element 11 and the first reflective member 13. The fourth reflective member 16 reflects the first color light Lb emitted from the first color separation element 11 in the +Y direction. The fourth reflective member 16 is arranged on the −X side of the first color separation element 11. The first color light Lb proceeding in the −X direction from the first color separation element 11 is reflected by a reflective surface 16A of the fourth reflective member 16 and proceeds in the +Y direction. The first reflective member 13 is arranged on the +Y side of the fourth reflective member 16. The first color light Lb proceeding in the +Y direction from the fourth reflective member 16 is reflected by a reflective surface 13A of the first reflective member 13 and proceeds in the +Z direction.

The second reflective member 14 reflects the second color light Lg emitted from the second color separation element 12 in the +Z direction. The second reflective member 14 is arranged on the −X side of the second color separation element 12. The second color light Lg proceeding in the −X direction from the second color separation element 12 is reflected by a reflective surface 14A of the second reflective member 14 and proceeds in the +Z direction.

The third reflective member 15 reflects the third color light Lr emitted from the second color separation element 12 in the +Z direction. The third reflective member 15 is arranged on the +Y side of the second color separation element 12. The third color light Lr proceeding in the +Y direction from the second color separation element 12 is reflected by a reflective surface 15A of the third reflective member 15 and proceeds in the +Z direction.

In the present embodiment, the reflective surface 13A of the first reflective member 13 and the reflective surface 15A of the third reflective member 15 are parallel to each other. The reflective surface 13A of the first reflective member 13 is parallel to the X-axis and is inclined in the +Z direction toward the +Y direction. Similarly, the reflective surface 15A of the third reflective member 15 is parallel to the X-axis and is inclined in the +Z direction toward the +Y direction.

In the present embodiment, the reflective surface 13A of the first reflective member 13 and the reflective surface 15A of the third reflective member 15 are arranged in the same plane. The plane including the reflective surface 13A of the first reflective member 13 and the reflective surface 15A of the third reflective member 15 is orthogonal to a plane including the reflective surface 14A of the second reflective member 14. In the present embodiment, the reflective surface 14A of the second reflective member 14 is parallel to the Y-axis and is inclined in the +Z direction toward the −X direction.

The relay optical system 20 is arranged in the optical path of the first color light Lb between the first color separation element 11 and the first reflective liquid crystal panel 31. In the present embodiment, the relay optical system 20 is arranged in the optical path of the first color light Lb between the first color separation element 11 and the first reflective member 13. The relay optical system 20 images an erect image of an object, which is on an object plane side of the relay optical system 20, on an image plane side of the relay optical system 20.

The relay optical system 20 includes: a first condenser lens 21 arranged between the first color separation element 11 and the fourth reflective member 16; and a second condenser lens 22 and a third condenser lens 23 which are arranged between the fourth reflective member 16 and the first reflective member 13. Each of the first condenser lens 21, the second condenser lens 22, and the third condenser lens 23 is a convex lens. The third condenser lens 23 is optically conjugate with the second lens array 6B. Since the third condenser lens 23 and the second lens array 6B are optically conjugate, and the second lens array 6B acts as the pupil of the first lens array 6A, images of the respective micro lenses of the first lens array 6A are formed between the second lens array 6B and the third condenser lens 23.

In the present embodiment, the relay optical system 20 forms an erect image of an object on the image plane side of the relay optical system 20. For example, when an image X is formed on the object plane side of the relay optical system 20, the relay optical system 20 forms an inverted image of the image X between the first color separation element 11 and the first reflective liquid crystal panel 31 which is the image plane, and forms an erect image of the image X on the image plane side of the relay optical system 20. In the present embodiment, the image X represents each portion of images of light emitted from the light source device 1 and received by the plurality of micro lenses of the first lens array 6A.

The first reflective liquid crystal panel 31 is arranged in the optical path of the first color light Lb. The first reflective liquid crystal panel 31 is a light modulation element which optically modulates the first color light Lb from the first reflective member 13 based on image data. The first reflective liquid crystal panel 31 is arranged on the +Z side of the first reflective member 13. The first color light Lb proceeding in the +Z direction from the first reflective member 13 is incident to the first reflective liquid crystal panel 31.

The first reflective liquid crystal panel 31 includes a first incident surface 31A to which the first color light Lb from the first reflective member 13 is incident. The first reflective liquid crystal panel 31 reflects the first color light Lb from the first reflective member 13 in the −Z direction.

The second reflective liquid crystal panel 32 is arranged in the optical path of the second color light Lg. The second reflective liquid crystal panel 32 is a light modulation element which optically modulates the second color light Lg from the second reflective member 14 based on image data. The second reflective liquid crystal panel 32 is arranged on the +Z side of the second reflective member 14. The second color light Lg proceeding in the +Z direction from the second reflective member 14 is incident to the second reflective liquid crystal panel 32.

The second reflective liquid crystal panel 32 includes a second incident surface 32A to which the second color light Lg from the second reflective member 14 is incident. The second reflective liquid crystal panel 32 reflects the second color light Lg from the second reflective member 14 in the −Z direction.

The third reflective liquid crystal panel 33 is arranged in the optical path of the third color light Lr. The third reflective liquid crystal panel 33 is a light modulation element which optically modulates the third color light Lr from the third reflective member 15 based on image data. The third reflective liquid crystal panel 33 is arranged on the +Z side of the third reflective member 15. The third color light Lr proceeding in the +Z direction from the third reflective member 15 is incident to the third reflective liquid crystal panel 33.

The third reflective liquid crystal panel 33 includes a third incident surface 33A to which the third color light Lr of the third reflective member 15 is incident. The third reflective liquid crystal panel 33 reflects the third color light Lr from the third reflective member 15 in the −Z direction.

The first incident surface 31A of the first reflective liquid crystal panel 31 is parallel to the XY plane and faces the −Z direction. Similarly, the second incident surface 32A of the second reflective liquid crystal panel 32 and the third incident surface 33A of the third reflective liquid crystal panel 33 are parallel to the XY plane and face the −Z direction. In the present embodiment, the first incident surface 31A of the first reflective liquid crystal panel 31, the second incident surface 32A of the second reflective liquid crystal panel 32, and the third incident surface 33A of the third reflective liquid crystal panel 33 face the same direction and are arranged in the same plane which is parallel to the XY plane.

A first polarizer 61 and a second polarizer 62 are arranged in the optical path of the first color light Lb between the first reflective member 13 and the first reflective liquid crystal panel 31. A third polarizer 63 and a fourth polarizer 64 are arranged in the optical path of the second color light Lg between the second reflective member 14 and the second reflective liquid crystal panel 32. A fifth polarizer 65 and a sixth polarizer 66 are arranged in the optical path of the third color light Lr between the third reflective member 15 and the third reflective liquid crystal panel 33.

The first polarizer 61 passes the first color light Lb in the first polarization state which has been reflected by the first reflective member 13. The first color light Lb in the first polarization state which has passed through the first polarizer 61 passes through the second polarizer 62 and is incident to the first reflective liquid crystal panel 31. The first reflective liquid crystal panel 31 optically modulates the first color light Lb which has passed through the first polarizer 61 and the second polarizer 62 based on the image data. The second polarizer 62 is arranged in the optical path of the first color light Lb between the first polarizer 61 and the first reflective liquid crystal panel 31. The second polarizer 62 passes the first color light Lb in the first polarization state from the first polarizer 61, and reflects the first color light Lb in the second polarization state, which has been incident to the first reflective liquid crystal panel 31 via the first polarizer 61 and reflected from the first reflective liquid crystal panel 31, to the combining optical system 40.

The third polarizer 63 passes the second color light Lg in the first polarization state which has been reflected by the second reflective member 14. The second color light Lg in the first polarization state which has passed through the third polarizer 63 passes through the fourth polarizer 64 and is incident to the second reflective liquid crystal panel 32. The second reflective liquid crystal panel 32 optically modulates the second color light Lg which has passed through the third polarizer 63 and the fourth polarizer 64 based on the image data. The fourth polarizer 64 is arranged in the optical path of the second color light Lg between the third polarizer 63 and the second reflective liquid crystal panel 32. The fourth polarizer 64 passes the second color light Lg in the first polarization state from the third polarizer 63, and reflects the second color light Lg in the second polarization state, which has been incident to the second reflective liquid crystal panel 32 via the third polarizer 63 and reflected from the second reflective liquid crystal panel 32, to the combining optical system 40.

The fifth polarizer 65 passes the third color light Lr in the first polarization state which has been reflected by the third reflective member 15. The third color light Lr in the first polarization state which has passed through the fifth polarizer 65 passes through the sixth polarizer 66 and is incident to the third reflective liquid crystal panel 33. The third reflective liquid crystal panel 33 optically modulates the third color light Lr which has passed through the fifth polarizer 65 and the sixth polarizer 66 based on the image data. The sixth polarizer 66 is arranged in the optical path of the third color light Lr between the fifth polarizer 65 and the third reflective liquid crystal panel 33. The sixth polarizer 66 passes the third color light Lr in the first polarization state from the fifth polarizer 65, and reflects the third color light Lr in the second polarization state, which has been incident to the third reflective liquid crystal panel 33 via the fifth polarizer 65 and reflected from the third reflective liquid crystal panel 33, to the combining optical system 40.

A transmissive polarizer 67 is arranged in the optical path of the first color light Lb between the second polarizer 62 and the combining optical system 40. The transmissive polarizer 67 passes the first color light Lb in the second polarization state out of the first color light Lb which has been emitted from the second polarizer 62 to the combining optical system 40 and prevents passage of the first color light Lb in the first polarization state which is unnecessary.

A transmissive polarizer 68 is arranged in the optical path of the second color light Lg between the fourth polarizer 64 and the combining optical system 40. The transmissive polarizer 68 passes the second color light Lg in the second polarization state out of the second color light Lg which has been emitted from the fourth polarizer 64 to the combining optical system 40 and prevents passage of the second color light Lg in the first polarization state which is unnecessary.

A transmissive polarizer 69 is arranged in the optical path of the third color light Lr between the sixth polarizer 66 and the combining optical system 40. The transmissive polarizer 69 passes the third color light Lr in the second polarization state out of the third color light Lr which has been emitted from the sixth polarizer 66 to the combining optical system 40 and prevents passage of the third color light Lr in the first polarization state which is unnecessary.

Incidentally, the first polarization state is, for example, a P-polarized state. The second polarization state is, for example, an S-polarized state.

Figure 3:
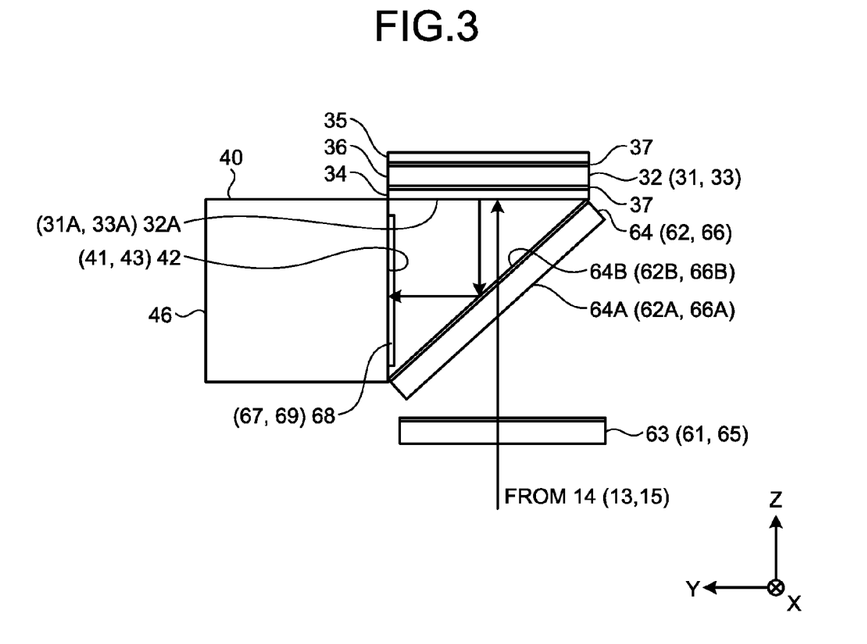
FIG. 3 is a diagram schematically illustrating a part of the projection display device according to the present embodiment.

FIG. 3 is a diagram schematically illustrating a part of the projection display device 100 according to the present embodiment. FIG. 3 is the diagram schematically illustrating: the second reflective liquid crystal panel 32; the third polarizer 63 and the fourth polarizer 64 arranged in the optical path of the second color light Lg between the second reflective liquid crystal panel 32 and the second reflective member 14; and the transmissive polarizer 68 arranged in the optical path of the second color light Lg between the fourth polarizer 64 and the combining optical system 40.

As illustrated in FIGS. 2 and 3, the second reflective liquid crystal panel 32 is arranged in the +Z direction more than the combining optical system 40. The fourth polarizer 64 is arranged on the −Y side of the combining optical system 40 and is arranged on the −Z side of the second reflective liquid crystal panel 32. The third polarizer 63 is arranged on the −Z side of the fourth polarizer 64.

The second reflective liquid crystal panel 32 includes a transparent substrate 34 including transparent electrodes, an active matrix substrate 35 including reflective electrodes, and a liquid crystal layer 36 provided between the transparent substrate 34 and the active matrix substrate 35. An alignment film 37 is provided on a top surface of the transparent substrate 34 facing the liquid crystal layer 36. An alignment film 37 is provided on a top surface of the active matrix substrate 35 facing the liquid crystal layer 36

The reflective electrodes are arranged in a matrix form for every pixel in the active matrix substrate 35. The transparent substrate 34 and the active matrix substrate 35 are arranged such that the transparent electrode and the reflective electrode oppose each other. An outer surface of the transparent substrate 34 includes the second incident surface 32A. The liquid crystal layer 36 includes a nematic liquid crystal which is arranged between the transparent electrode and the reflective electrode. The nematic liquid crystal has a negative dielectric anisotropy. The nematic liquid crystal is provided between the transparent substrate 34 and the active matrix substrate 35 in a state where a pre-tilt angle is given.

The third polarizer 63 is a wire grid polarizer. The third polarizer 63 passes the second color light Lg reflected by the second reflective member 14. The second color light Lg which has passed through the third polarizer 63 is incident to the second reflective liquid crystal panel 32 via the fourth polarizer 64. The second reflective liquid crystal panel 32 optically modulates the second color light Lg from the fourth polarizer 64 based on the image data. In the present embodiment, the second color light Lg in the first polarization state is incident to the third polarizer 63 by the polarization conversion element 7. The third polarizer 63 passes the second color light Lg in the first polarization state from the second reflective member 14.

The fourth polarizer 64 is a wire grid polarizer. The fourth polarizer 64 is arranged in the optical path of the second color light Lg between the third polarizer 63 and the second reflective liquid crystal panel 32. The fourth polarizer 64 passes the second color light Lg in the first polarization state which has been emitted from the third polarizer 63 and incident to the second reflective liquid crystal panel 32. The second color light Lg which has passed through the fourth polarizer 64 is incident to the second incident surface 32A of the transparent substrate 34 of the second reflective liquid crystal panel 32. The second color light Lg which has been incident to the second incident surface 32A is incident to the liquid crystal layer 36 via the transparent substrate 34, passes through the liquid crystal layer 36, and then, is reflected by the reflective electrode of the active matrix substrate 35. The second color light Lg which has been reflected by the reflective electrode of the active matrix substrate 35 passes through the liquid crystal layer 36 again, and then, is emitted from the transparent substrate 34 of the second reflective liquid crystal panel 32. The second color light Lg of the second polarization state is emitted from the second reflective liquid crystal panel 32. The second color light Lg in the second polarization state which has been emitted from the second reflective liquid crystal panel 32 is incident to the fourth polarizer 64.

The fourth polarizer 64 includes an incident surface 64A to which the second color light Lg from the third polarizer 63 is incident and a reflective surface 64B which reflects the second color light Lg from the second reflective liquid crystal panel 32. The fourth polarizer 64 is inclined with respect to the optical path of the second color light Lg incident to the second reflective liquid crystal panel 32. The incident surface 64A of the fourth polarizer 64 and the optical path of the second color light Lg incident to the incident surface 64A of the fourth polarizer 64 intersect each other at an angle of 45 [°]. The second color light Lg reflected by the second reflective liquid crystal panel 32 proceeds in the −Z direction. The reflective surface 64B of the fourth polarizer 64 and the optical path of the second color light Lg incident to the reflective surface 64B of the fourth polarizer 64 intersect each other at an angle of 45 [°].

The fourth polarizer 64 reflects the second color light Lg in the second polarization state from the second reflective liquid crystal panel 32 in the +Y direction. The second color light Lg in the second polarization state which has been emitted from the second reflective liquid crystal panel 32 is reflected by the fourth polarizer 64, proceeds in the +Y direction, and is incident to the combining optical system 40. The second color light Lg in the first polarization state, which is unnecessary, out of the second color light Lg incident from the fourth polarizer 64 to the combining optical system 40 is eliminated by the transmissive polarizer 68, and the second color light Lg in the second polarization state is incident to the combining optical system 40.

As above, each action of the second reflective liquid crystal panel 32, the third polarizer 63, the fourth polarizer 64, the transmissive polarizer 68, and the combining optical system 40 has been described with reference to FIG. 3. Similarly to the fourth polarizer 64, the second polarizer 62 includes an incident surface 62A and a reflective surface 62B, and the sixth polarizer 66 includes an incident surface 66A and a reflective surface 66B. Each action of the first reflective liquid crystal panel 31, the first polarizer 61, the second polarizer 62, the transmissive polarizer 67, and the combining optical system 40 and each action of the third reflective liquid crystal panel 33, the fifth polarizer 65, the sixth polarizer 66, the transmissive polarizer 69, and the combining optical system 40 are the same as each action of the second reflective liquid crystal panel 32, the third polarizer 63, the fourth polarizer 64, the transmissive polarizer 68, and the combining optical system 40, and thus, will not be described.

In the present embodiment, the first, second, and third incident surfaces 31A, 32A and 33A of the first, second, and third reflective liquid crystal panels 31, 32 and 33 are optically conjugate with the plurality of micro lenses of the first lens array 6A, respectively. Therefore, images of the plurality of micro lenses of the first lens array 6A are superimposed on each other in the first, second, and third incident surfaces 31A, 32A and 33A of the first, second, and third reflective liquid crystal panels 31, 32 and 33. Accordingly, each illuminance distribution on the first, second, and third incident surfaces 31A, 32A and 33A of the first, second, and third reflective liquid crystal panels 31, 32 and 33 are made uniform.

The combining optical system 40 combines the first color light Lb which has been optically modulated by the first reflective liquid crystal panel 31, the second color light Lg which has been optically modulated by the second reflective liquid crystal panel 32, and the third color light Lr which has been optically modulated by the third reflective liquid crystal panel 33 to generate the combined light. In the present embodiment, the combining optical system 40 includes a cross dichroic prism. The combining optical system 40 includes: an incident surface 41 to which the first color light Lb which has been optically modulated by the first reflective liquid crystal panel 31 is incident; an incident surface 42 to which the second color light Lg which has been optically modulated by the second reflective liquid crystal panel 32 is incident; an incident surface 43 to which the third color light Lr which has been optically modulated by the third reflective liquid crystal panel 33 is incident, and an emitting surface 46 to emit the combined light.

The incident surface 41 is parallel to a YZ plane and faces the −X direction. The incident surface 42 is parallel to the XZ plane and faces the −Y direction. The incident surface 43 is parallel to the YZ plane and faces the +X direction. The emitting surface 46 is parallel to the XZ plane and faces the +Y direction.

The combining optical system 40 includes: a first combining surface 44 to combine the first color light Lb incident from the incident surface 41 and the second color light Lg incident from the incident surface 42; and a second combining surface 45 to combine the second color light Lg incident from the incident surface 42 and the third color light Lr incident from the incident surface 43. The first combining surface 44 and the second combining surface 45 are parallel to the Z axis. The first combining surface 44 and the second combining surface 45 are orthogonal to each other.

The first combining surface 44 reflects the first color light Lb which has been emitted from the first reflective liquid crystal panel 31 and incident from the incident surface 41 via the second polarizer 62. The first combining surface 44 passes the second color light Lg which has been emitted from the second reflective liquid crystal panel 32 and incident from the incident surface 42 via the fourth polarizer 64.

The second combining surface 45 passes the second color light Lg which has been emitted from the second reflective liquid crystal panel 32 and incident from the incident surface 42 via the fourth polarizer 64. The second combining surface 45 reflects the third color light Lr which has been emitted from the third reflective liquid crystal panel 33 and incident from the incident surface 43 via the sixth polarizer 66.

The projection optical system 50 projects the combined light, which has been generated by the combining optical system 40 and emitted from the emitting surface 46, onto a screen 70. The projection optical system 50 is optically conjugate with the second lens array 6B. In addition, the surface of the screen 70 is optically conjugate with each of the plurality of micro lenses of the first lens array 6A.

Figure 4:
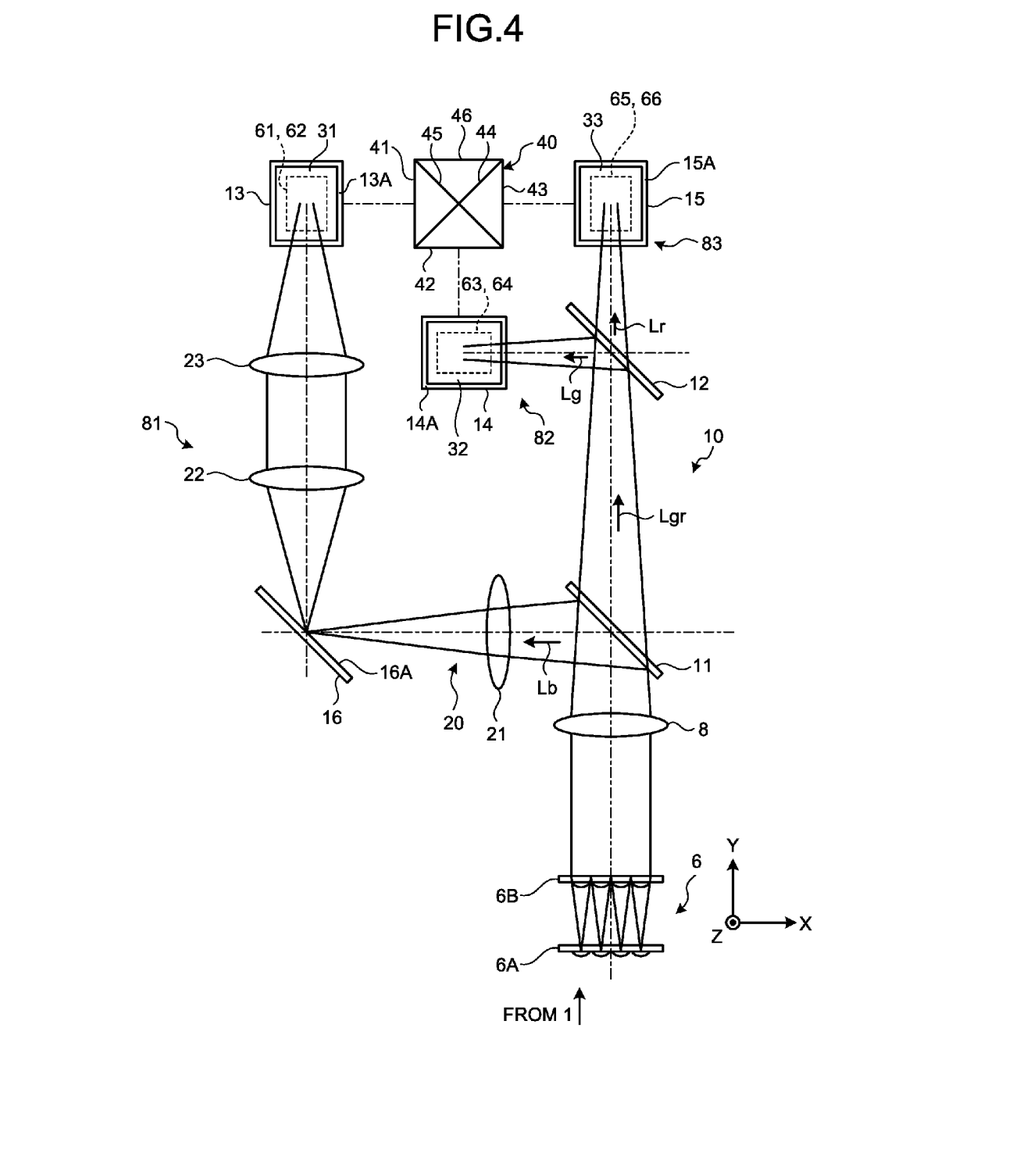
FIG. 4 is a plan view for describing action of the projection display device according to the present embodiment.
Figure 5:
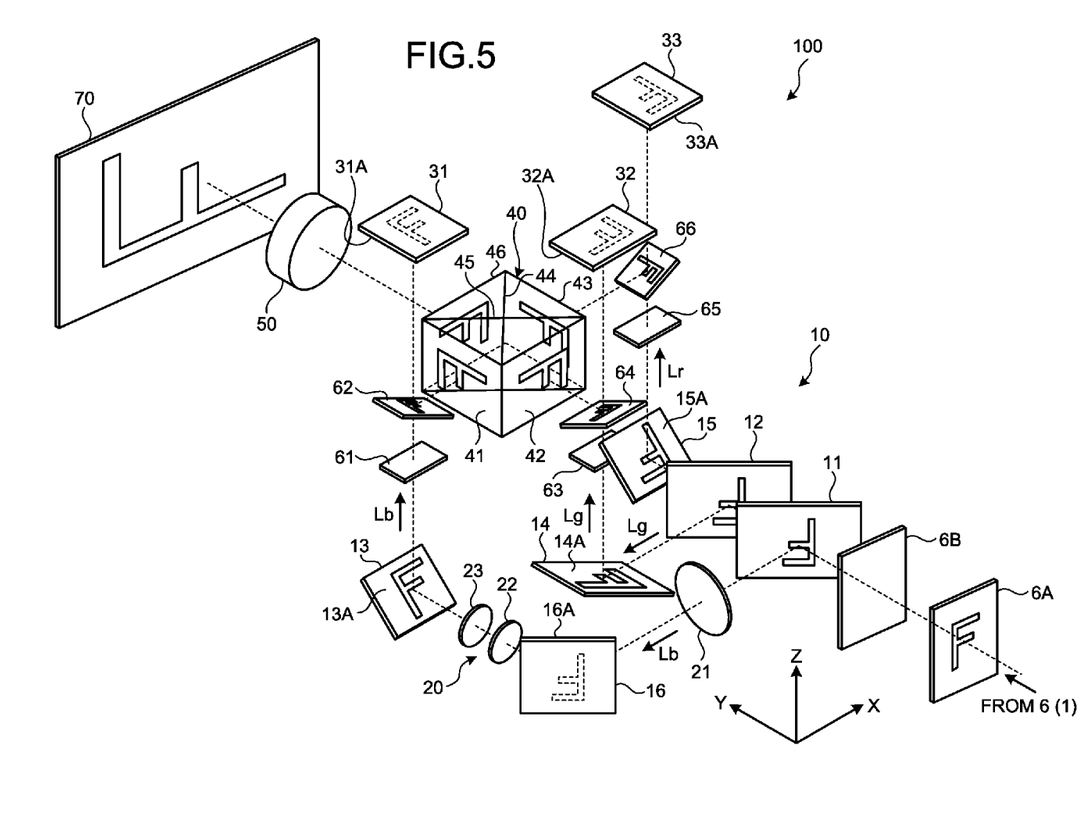
FIG. 5 is a perspective view for describing action of the projection display device according to the present embodiment.

Next, action of the projection display device 100 according to the present embodiment will be described. FIG. 4 is a plan view for describing the action of the projection display device 100 according to the present embodiment. FIG. 5 is a perspective view for describing the action of the projection display device 100 according to the present embodiment.

In the present embodiment, when there is a deviation in intensity distribution of light emitted from the light source device 1, an optical system of the projection display device 100 including the illumination optical system 10 is constructed such that a deviation of light intensity distribution formed on the emitting surface 46 side of the combining optical system 40 (the image plane side of the projection optical system 50) by a plurality of optical components arranged in the optical path of the first color light Lb, a deviation of light intensity distribution formed on the emitting surface 46 side of the combining optical system 40 (the image plane side of the projection optical system 50) by a plurality of optical components arranged in the optical path of the second color light Lg, and a deviation of light intensity distribution formed on the emitting surface 46 side of the combining optical system 40 (the image plane side of the projection optical system 50) by a plurality of optical components arranged in the optical path of the third color light Lr match each other.

In the following description, an optical system configured of the plurality of optical components arranged in the optical path of the first color light Lb will be appropriately referred to as a first color light optical system 81. An optical system configured of the plurality of optical components arranged in the optical path of the second color light Lg will be appropriately referred to as a second color light optical system 82. An optical system configured of the plurality of optical components arranged in the optical path of the third color light Lr will be appropriately referred to as a third color light optical system 83.

The first color light optical system 81 includes the first color separation element 11, the fourth reflective member 16, the first reflective member 13, the relay optical system 20, the first polarizer 61, the second polarizer 62, and the first reflective liquid crystal panel 31.

The second color light optical system 82 includes the first color separation element 11, the second color separation element 12, the second reflective member 14, the third polarizer 63, the fourth polarizer 64, and the second reflective liquid crystal panel 32.

The third color light optical system 83 includes the first color separation element 11, the second color separation element 12, the third reflective member 15, the fifth polarizer 65, the sixth polarizer 66, and the third reflective liquid crystal panel 33.

In the present embodiment, the deviation of the light intensity distribution of the light source device 1 formed by the first color light optical system 81 on the emitting surface 46 side of the combining optical system 40, the deviation of the light intensity distribution of the light source device 1 formed by the second color light optical system 82 on the emitting surface 46 side of the combining optical system 40, and the deviation of the light intensity distribution of the light source device 1 formed by the third color light optical system 83 on the emitting surface 46 side of the combining optical system 40 match each other.

Action of the first color light optical system 81 will be described. Light, which has been emitted from the light source device 1, been uniformized in a plane vertical to the light axis of the integrator optical system 6 by the integrator optical system 6, and passed through the condenser lens 8 is separated into the first color light Lb and the light Lgr having the different wavelength from the first color light Lb in the first color separation element 11. The first color light Lb is reflected by the first color separation element 11 in the XY plane. First reflection of the first color light Lb is performed in the first color separation element 11.

As illustrated in FIG. 4, the condenser lens 8 and the first condenser lens 21 of the relay optical system 20 condense the first color light Lb on the reflective surface 16A of the fourth reflective member 16. In the first color light optical system 81, a first intermediate image of a light source image is formed on the reflective surface 16A of the fourth reflective member 16. That is, a first imaging point of the first color light optical system 81 is formed on the reflective surface 16A of the fourth reflective member 16.

The first color light Lb reflected by the first color separation element 11 is incident to the fourth reflective member 16. The first color light Lb is reflected by the fourth reflective member 16 in the XY plane. Second reflection of the first color light Lb is performed in the fourth reflective member 16.

The first color light Lb reflected by the fourth reflective member 16 is incident to the first reflective member 13. The first color light Lb is reflected by the first reflective member 13 in the YZ plane. Third reflection of the first color light Lb is performed in the first reflective member 13.

The first color light Lb which has been reflected by the first reflective member 13 passes through the first polarizer 61 and the second polarizer 62, and is incident to the first reflective liquid crystal panel 31. The first color light Lb is reflected in the −Z direction by the first reflective liquid crystal panel 31. Fourth reflection of the first color light Lb is performed in the first reflective liquid crystal panel 31.

As illustrated in FIG. 4, the second condenser lens 22 and the third condenser lens 23 of the relay optical system 20 condense the first color light Lb on the first incident surface 31A of the first reflective liquid crystal panel 31. In the first color light optical system 81, a second intermediate image of the light source image is formed on the first reflective liquid crystal panel 31. That is, a second imaging point in the first color light optical system 81 is formed on the first incident surface 31A of the first reflective liquid crystal panel 31. The first lens array 6A and the first incident surface 31A of the first reflective liquid crystal panel 31 are optically conjugate.

The first color light Lb reflected by the first reflective liquid crystal panel 31 is incident to the second polarizer 62. The first color light Lb is reflected by the second polarizer 62 in the XZ plane. Fifth reflection of the first color light Lb is performed in the second polarizer 62.

The first color light Lb reflected by the second polarizer 62 is incident to the incident surface 41 of the combining optical system 40.

In this manner, the first color light Lb is reflected five times by the plurality of optical components in the first color light optical system 81, and is incident to the combining optical system 40.

A mirror image of an image is formed through the reflection by the optical components. The mirror image means an image of an object created by reflection of a plane mirror. In other words, the mirror image means an image which is inverted only laterally or vertically, and the object and the mirror image thereof have a plane-symmetric relationship.

Further, the first color light Lb is condensed twice by the relay optical system 20. That is, the first color light Lb is imaged twice in the first color light optical system 81, and is incident to the combining optical system 40. An inverted image of an image is formed by the relay optical system 20. The inverted image means an image of an object created through a convex lens or the like, and the image of the object and the inverted image thereof have a 180 [°] rotationally symmetric relationship around the light axis.

Next, action of the second color light optical system 82 will be described. The light, which has been emitted from the light source device 1, been uniformized in the plane vertical to the light axis of the integrator optical system 6 by the integrator optical system 6, and passed through the condenser lens 8, is separated into the first color light Lb and the light Lgr having the different wavelength from the first color light Lb in the first color separation element 11. The light Lgr which has passed through the first color separation element 11 is separated into the second color light Lg and the third color light Lr in the second color separation element 12. The second color light Lg is reflected by the second color separation element 12 in the XY plane. First reflection of the second color light Lg is performed in the second color separation element 12.

The second color light Lg reflected by the second color separation element 12 is incident to the second reflective member 14. The second color light Lg is reflected by the second reflective member 14 in the XZ plane. Second reflection of the second color light Lg is performed in the second reflective member 14.

The second color light Lg which has been reflected by the second reflective member 14 passes through the third polarizer 63 and the fourth polarizer 64, and is incident to the second reflective liquid crystal panel 32. The second color light Lg is reflected in the −Z direction by the second reflective liquid crystal panel 32. Third reflection of the second color light Lg is performed in the second reflective liquid crystal panel 32.

As illustrated in FIG. 4, the condenser lens 8 condenses the second color light Lg on the second incident surface 32A of the second reflective liquid crystal panel 32. In the second color light optical system 82, an intermediate image of the light source image is formed on the second reflective liquid crystal panel 32. That is, an imaging point in the second color light optical system 82 is formed on the second incident surface 32A of the second reflective liquid crystal panel 32. The first lens array 6A and the second incident surface 32A of the second reflective liquid crystal panel 32 are optically conjugate.

The second color light Lg which has been reflected by the second reflective liquid crystal panel 32 is incident to the fourth polarizer 64. The second color light Lg is reflected by the fourth polarizer 64 in the YZ plane. Fourth reflection of the second color light Lg is performed in the fourth polarizer 64.

The second color light Lg which has been reflected by the fourth polarizer 64 is incident to the incident surface 42 of the combining optical system 40.

In this manner, the second color light Lg is reflected four times by the plurality of optical components in the second color light optical system 82, and is incident to the combining optical system 40. In addition, the second color light Lg is imaged once in the second color light optical system 82 and is incident to the combining optical system 40.

Next, action of the third color light optical system 83 will be described. The light Lgr, which has been emitted from the light source device 1, been uniformized in the plane vertical to the light axis of the integrator optical system 6 by the integrator optical system 6, and passed through the condenser lens 8 and the first color separation element 11, is separated into the second color light Lg and the third color light Lr in the second color separation element 12. The third color light Lr passes through the second color separation element 12.

The third color light Lr which has passed through the second color separation element 12 is incident to the third reflective member 15. The third color light Lr is reflected by the third reflective member 15 in the YZ plane. First reflection of the third color light Lr is performed in the third reflective member 15.

The third color light Lr which has been reflected by the third reflective member 15 passes through the fifth polarizer 65 and the sixth polarizer 66, and is incident to the third reflective liquid crystal panel 33. The third color light Lr is reflected in the −Z direction by the third reflective liquid crystal panel 33. Second reflection of the third color light Lr is performed in the third reflective liquid crystal panel 33.

As illustrated in FIG. 4, the condenser lens 8 condenses the third color light Lr on the third incident surface 33A of the third reflective liquid crystal panel 33. In the third color light optical system 83, an intermediate image of the light source image is formed on the third reflective liquid crystal panel 33. That is, an imaging point in the third color light optical system 83 is formed on the third incident surface 33A of the third reflective liquid crystal panel 33. The first lens array 6A and the third incident surface 33A of the third reflective liquid crystal panel 33 are optically conjugate.

The third color light Lr which has been reflected by the third reflective liquid crystal panel 33 is incident to the sixth polarizer 66. The third color light Lr is reflected by the sixth polarizer 66 in the XZ plane. Third reflection of the third color light Lr is performed in the sixth polarizer 66.

The third color light Lr which has been reflected by the sixth polarizer 66 is incident to the incident surface 43 of the combining optical system 40.

In this manner, the third color light Lr is reflected three times by the plurality of optical components in the third color light optical system 83, and is incident to the combining optical system 40. The third color light Lr is imaged once in the third color light optical system 83 and is incident to the combining optical system 40.

Next, a description will be given regarding a change of the deviation of the light intensity distribution of the light source device 1 in each of the first color light optical system 81, the second color light optical system 82, and the third color light optical system 83 with reference to FIG. 5. In the description with reference to FIG. 5, a directivity (direction) of a light source image indicating the deviation of light intensity distribution will be illustrated to correspond to a graphical directivity of a letter "F" in order to facilitate understanding of the deviation of light intensity distribution. Incidentally, the letter "F" is schematically illustrated in each optical part in FIG. 5, the light source image. To be exact, however, each image at each micro lens of the first lens array 6A is imaged only on a corresponding conjugate plane. That is, the light source image is imaged in each of the third condenser lens 23, the first reflective liquid crystal panel 31, the second reflective liquid crystal panel 32, and the third reflective liquid crystal panel 33 each of which has a positional relationship of being optically conjugate with the first lens array 6A. In the XZ plane, a reference direction is set to a direction of a light source image whose "F" is read in a right direction when seen from a direction toward the screen 70 from the light source device 1 in a light axis direction with the +Z direction as the top of "F".

A description will be given regarding the direction of the light source image indicating the deviation of light intensity distribution in the first color light optical system 81. The mirror image of the light source image is formed by reflection in the first color separation element 11. In addition, the light source image is inverted by the action of the first condenser lens 21 of the relay optical system 20. Accordingly, the direction of the light source image becomes a direction rotated by 180 [°] (inverted direction) in the reflective surface 16A of the fourth reflective member 16 as illustrated in FIG. 5.

The mirror image of the light source image is formed through reflection in the fourth reflective member 16. In addition, the direction of the light source image is inverted by the action of the second condenser lens 22 and the third condenser lens 23 of the relay optical system 20. Accordingly, the direction of the light source image becomes the reference direction without being inverted and rotated in the reflective surface 13A of the first reflective member 13 as illustrated in FIG. 5.

The mirror image of the light source image is formed through reflection in the first reflective member 13. Accordingly, the direction of the light source image becomes a vertically inverted direction in the first incident surface 31A of the first reflective liquid crystal panel 31 as illustrated in FIG. 5.

The mirror image of the light source image is formed through reflection in the first reflective liquid crystal panel 31. Accordingly, the direction of the light source image becomes the direction rotated by 180 [°] (inverted direction) in the reflective surface of the second polarizer 62 as illustrated in FIG. 5.

The mirror image of the light source image is formed through reflection in the second polarizer 62. Accordingly, the direction of the light source image becomes the vertically inverted direction in the incident surface 41 of the combining optical system 40 as illustrated in FIG. 5.

Next, a description will be given regarding the direction of the light source image indicating the deviation of light intensity distribution in the second color light optical system 82. The mirror image of the light source image is formed through reflection in the second color separation element 12. Accordingly, the direction of the light source image becomes a direction rotated by 180 [°] (inverted direction) in the reflective surface 14A of the second reflective member 14 as illustrated in FIG. 5.

The mirror image of the light source image is formed through reflection in the second reflective member 14. Thus, the direction of the light source image becomes a vertically inverted direction in the second incident surface 32A of the second reflective liquid crystal panel 32 as illustrated in FIG. 5.

The mirror image of the light source image is formed through reflection in the second reflective liquid crystal panel 32. In addition, the light source image is inverted by the action of the condenser lens 8. Accordingly, the direction of the light source image becomes the vertically inverted direction in the reflective surface of the fourth polarizer 64 as illustrated in FIG. 5.

The mirror image of the light source image is formed through reflection in the fourth polarizer 64. Accordingly, the direction of the light source image becomes the reference direction without being inverted and rotated in the incident surface 42 of the combining optical system 40 as illustrated in FIG. 5.

Next, a description will be given regarding the direction of the light source image indicating the deviation of light intensity distribution in the third color light optical system 83. The mirror image of the light source image is formed through reflection in the third reflective member 15. Accordingly, the direction of the light source image becomes a vertically inverted direction in the third incident surface 33A of the third reflective liquid crystal panel 33 as illustrated in FIG. 5.

The mirror image of the light source image is formed through reflection in the third reflective liquid crystal panel 33. In addition, the light source image is inverted by the action of the condenser lens 8. Accordingly, the direction of the light source image becomes the reference direction without being inverted and rotated in the reflective surface of the sixth polarizer 66 as illustrated in FIG. 5.

The mirror image of the light source image is formed through reflection in the sixth polarizer 66. Accordingly, the direction of the light source image becomes the vertically inverted direction in the incident surface 43 of the combining optical system 40 as illustrated in FIG. 5.

The light source image formed in the incident surface 41 and the light source image formed in the incident surface 42 are combined in the first combining surface 44 of the combining optical system 40. As illustrated in FIG. 5, the light source image formed in the incident surface 41 and the light source image formed in the incident surface 42 match each other in the first combining surface 44 of the combining optical system 40.

The light source image formed in the incident surface 42 and the light source image formed in the incident surface 43 are combined in the second combining surface 45 of the combining optical system 40. As illustrated in FIG. 5, the light source image formed in the incident surface 42 and the light source image formed in the incident surface 43 match each other in the second combining surface 45 of the combining optical system 40.

Therefore, the direction of the light source image formed by the first color light optical system 81 on the emitting surface 46 side of the combining optical system 40, the direction of the light source image formed by the second color light optical system 82 on the emitting surface 46 side of the combining optical system 40, and the direction of the light source image formed by the third color light optical system 83 on the emitting surface 46 side of the combining optical system 40 match each other.

That is, in the present embodiment as illustrated in FIG. 10, the direction of the light source image incident to the incident surface 41 and the direction of the light source image incident to the incident surface 42 are mirror-symmetric to each other with respect to the first combining surface 44. In addition, the direction of the light source image incident to the incident surface 42 and the direction of the light source image incident to the incident surface 43 are mirror-symmetric to each other with respect to the second combining surface 45. The directions of the light source images of the color light of the respective colors emitted from the combining optical system 40 match each other due to such a relationship among the direction of the light source image incident to the incident surface 41 of the combining optical system 40, the direction of the light source image incident to the incident surface 42, and the direction of the light source image incident to the incident surface 43.

As described above, by providing the relay optical system 20 in the optical path of the first color light Lb, it is possible to match the directions of the optical images formed on the light emitting side of the combining optical system 40 or the light emitting side of the projection optical system 50, for each of the first color light Lb, the second color light Lg, and the third color light Lr respectively, according to the present embodiment. Therefore, it is possible to suppress the occurrence of color unevenness in the image projected by the projection optical system 50, for example, even if the deviation is generated in the illumination distribution of the first color light Lb with which the first incident surface 31A of the first reflective liquid crystal panel 31 is irradiated, the deviation is generated in the illumination distribution of the second color light Lg with which the second incident surface 32A of the second reflective liquid crystal panel 32 is irradiated, or the deviation is generated in the illumination distribution of the third color light Lr with which the third incident surface 33A of the third reflective liquid crystal panel 33 is irradiated. Such deviation is caused, for example, due to at least one of a mounting error of the solid light source 2, a positional change of the solid light source 2, a mounting error of the phosphor 3, a positional change of the phosphor 3, a mounting error of the half mirror 4, a positional change of the half mirror 4, a mounting error of the light-collection optical system 5, and a positional change of the light-collection optical system 5.

In addition, the first color light Lb is incident to the first reflective liquid crystal panel 31 by the first reflective member 13 which reflects the first color light Lb in the +Z direction, and the second color light Lg is incident to the second reflective liquid crystal panel 32 by the second reflective member 14 which reflects the second color light Lg in the +Z direction, and the third color light Lr is incident to the third reflective liquid crystal panel 33 by the third reflective member 15 which reflects the third color light Lr in the +Z direction in the present embodiment. Accordingly, it is possible to make the projection display device 100 compact. In addition, it is possible to provide a cooling mechanism, configured to cool the first, second, and third reflective liquid crystal panels 31, 32, and 33 at the back side of the first, second, and third reflective liquid crystal panels 31, 32, and 33, for example, since no optical component is arranged at the back side of the first, second, and third reflective liquid crystal panels 31, 32, and 33 on the active matrix substrate 35 side.

In addition, the relay optical system 20 is arranged between the first color separation element 11 and the first reflective member 13 according to the present embodiment. Therefore, it is possible to uniformize a structure of an optical system arranged in the optical path of the first color light Lb from the first reflective member 13 in the first color light optical system 81 to the incident surface 41 of the combining optical system 40, a structure of an optical system arranged in the optical path of the second color light Lg from the second reflective member 14 in the second color light optical system 82 to the incident surface 42 of the combining optical system 40, and a structure of an optical system arranged in the optical path of the third color light Lr from the third reflective member 15 in the third color light optical system 83 to the incident surface 43 of the combining optical system 40.

In addition, the first incident surface 31A of the first reflective liquid crystal panel 31, the second incident surface 32A of the second reflective liquid crystal panel 32, and the third incident surface 33A of the third reflective liquid crystal panel 33 face the −Z direction and are arranged in the same plane which is parallel to the XY plane, according to the present embodiment. Accordingly, it is possible to make the projection display device 100 compact and to uniformize the structure of the first color light optical system 81, the structure of the second color light optical system 82, and the structure of the third color light optical system 83.

In addition, the fourth reflective member 16 that reflects the first color light Lb from the first color separation element 11 toward the first reflective member 13 is provided according to the present embodiment. In addition, the reflective surface 13A of the first reflective member 13 and the reflective surface 15A of the third reflective member 15 are parallel to each other in the present embodiment. Accordingly, the optical path of the first color light Lb is suppressed from becoming long. Therefore, it is possible to make the projection display device 100 compact, and to suppress an optical loss of the first color light Lb which is incident to the first reflective liquid crystal panel 31.

Figure 6:
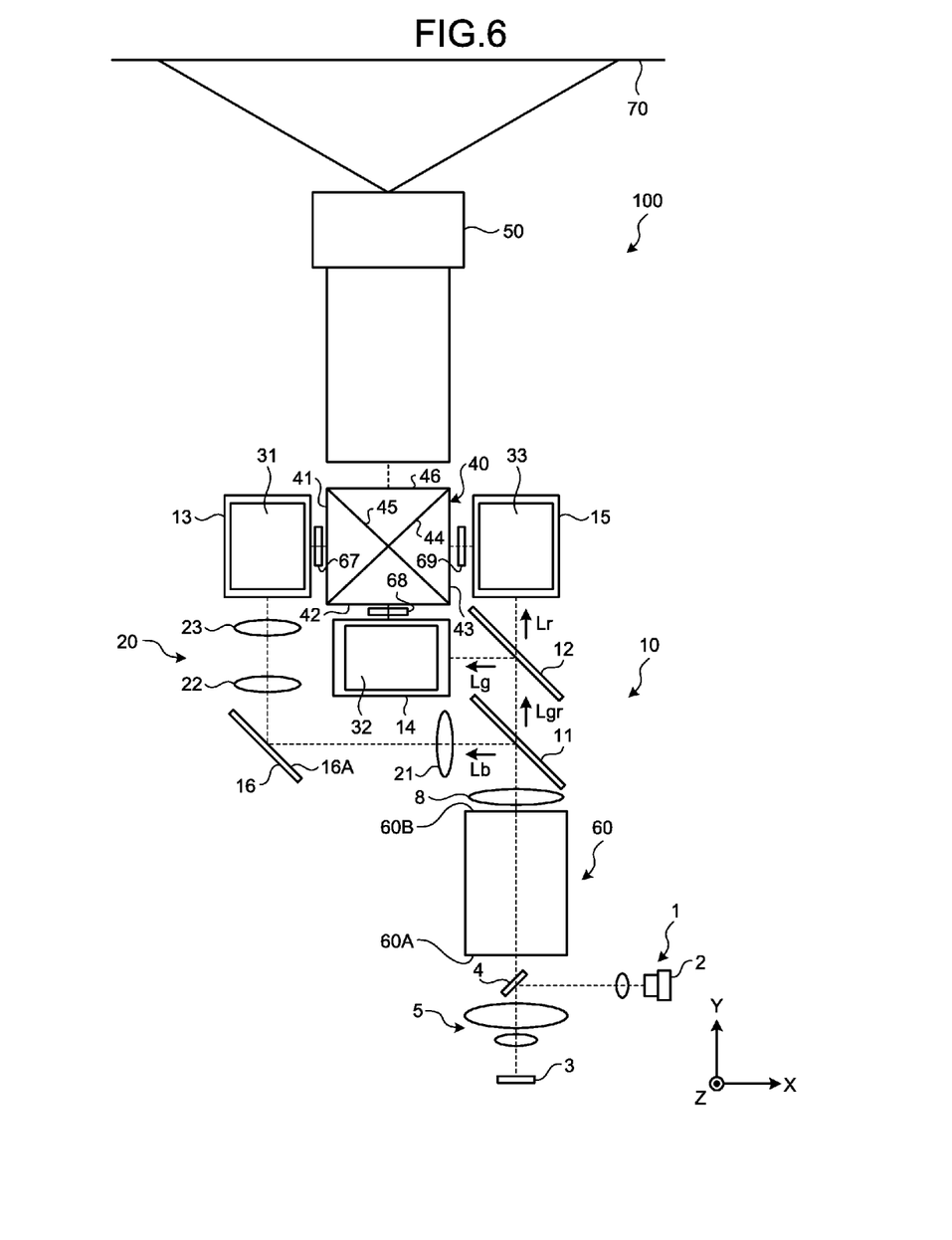
FIG. 6 is a plan view schematically illustrating an example of a projection display device according to a modified example of the present embodiment.

Next, a modified example of the projection display device 100 according to the present embodiment will be described. FIG. 6 is a plan view schematically illustrating an example of a projection display device 100 according to the modified example of the present embodiment. Differences of the projection display device 100 according to the modified example from the projection display device 100 that has been described in the above embodiment are: that an integrator optical system is configured using a light tunnel 60 instead of the first lens array 6A and the second lens array 6B; and that the polarization conversion element 7 is omitted. Since the other configurations are the same, the description thereof will be omitted.

In FIG. 6, light, which has been emitted from the light source device 1 and incident to a light tunnel incident surface 60A of the light tunnel 60, is reflected a plurality of times by an inner wall of the light tunnel 60. Accordingly, illuminance distribution is made uniform on a light tunnel emitting surface 60B of the light tunnel 60. The light which has been emitted from the light tunnel emitting surface 60B of the light tunnel 60 is incident to the condenser lens 8. The illumination optical system 10 has the same configuration as the above-described embodiment.

The first, second, and third incident surfaces 31A, 32A and 33A of the first, second, and third reflective liquid crystal panels 31, 32 and 33 are optically conjugate with the light tunnel emitting surface 60B of the light tunnel 60. Thus, an image of the light tunnel emitting surface 60B of the light tunnel 60 is formed on the first, second, and third incident surfaces 31A, 32A and 33A of the first, second, and third reflective liquid crystal panels 31, 32 and 33.

As described above, it is possible to obtain the same effects as the above-described embodiment even in the modified example of the present embodiment.

According to the aspect of the present embodiment, provided is the projection display device capable of suppressing the occurrence of color unevenness in the image projected by the projection optical system even when the deviation is generated in the illuminance distribution of the color light with which the light modulation element is irradiated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection display device comprising:
a first color separation element which separates first color light from light emitted from a light source device and emits the first color light in a first direction parallel to a first axis in a predetermined plane;
a second color separation element which separates the light emitted from the first color separation element into second color light and third color light, emits the second color light in the first direction, and emits the third color light in a second direction parallel to a second axis which is orthogonal to the first axis in the predetermined plane;
a first reflective member which reflects the first color light emitted from the first color separation element in a third direction parallel to a third axis orthogonal to the predetermined plane;
a second reflective member which reflects the second color light emitted from the second color separation element in the third direction;
a third reflective member which reflects the third color light emitted from the second color separation element in the third direction;
a first reflective liquid crystal panel which has a first incident surface to which the first color light reflected by the first reflective member is incident and optically modulates the first color light based on image data;
a second reflective liquid crystal panel which has a second incident surface to which the second color light reflected by the second reflective member is incident and optically modulates the second color light based on the image data;
a third reflective liquid crystal panel which has a third incident surface to which the third color light reflected by the third reflective member is incident and optically modulates the third color light based on the image data;
a combining optical system which combines the first color light optically modulated by the first reflective liquid crystal panel, the second color light optically modulated by the second reflective liquid crystal panel, and the third color light optically modulated by the third reflective liquid crystal panel to generate combined light;
a projection optical system which projects the combined light generated by the combining optical system; and
a relay optical system which is arranged in an optical path of the first color light between the first color separation element and the first reflective liquid crystal panel, and forms an erect image.

2. The projection display device according to claim 1, wherein the relay optical system is arranged between the first color separation element and the first reflective member.

3. The projection display device according to claim 1, wherein the first incident surface, the second incident surface, and the third incident surface face a direction opposite to the third direction, and are arranged in parallel to the predetermined plane.

4. The projection display device according to claim 1, further comprising
a fourth reflective member which is arranged between the first color separation element and the first reflective member, and reflects the first color light emitted from the first color separation element in the second direction,
wherein a reflective surface of the first reflective member and a reflective surface of the third reflective member are parallel to each other.

5. The projection display device according to claim 4, further comprising:
a first polarizer which is arranged in the optical path of the first color light between the first reflective member and the first reflective liquid crystal panel, and passes the first color light in a first polarization state reflected by the first reflective member;
a second polarizer which reflects the first color light in a second polarization state, incident to the first reflective liquid crystal panel via the first polarizer and reflected by the first reflective liquid crystal panel, to the combining optical system;
a third polarizer which is arranged in an optical path of the second color light between the second reflective member and the second reflective liquid crystal panel, and passes the second color light in the first polarization state reflected by the second reflective member;
a fourth polarizer which reflects the second color light in the second polarization state, incident to the second reflective liquid crystal panel via the third polarizer and reflected by the second reflective liquid crystal panel, to the combining optical system;
a fifth polarizer which is arranged in an optical path of the third color light between the third reflective member and the third reflective liquid crystal panel, and passes the third color light in the first polarization state reflected by the third reflective member; and
a sixth polarizer which reflects the third color light in the second polarization state, incident to the third reflective liquid crystal panel via the fifth polarizer and reflected by the third reflective liquid crystal panel, to the combining optical system.

* * * * *